US006167318A

United States Patent [19]
Kizer et al.

[11] Patent Number: 6,167,318
[45] Date of Patent: Dec. 26, 2000

[54] OIL MIST GENERATING SYSTEM AND METHOD

[75] Inventors: Morgan A. Kizer; Michael W. Taylor, both of Charlotte, N.C.

[73] Assignee: Alemite Corporation, Charlotte, N.C.

[21] Appl. No.: 08/995,376

[22] Filed: Dec. 22, 1997

[51] Int. Cl.$^7$ ................................................. G05B 15/00
[52] U.S. Cl. ........................... 700/83; 700/17; 700/46; 700/244; 700/254; 239/4; 239/5; 239/7; 239/8; 184/6.1; 184/6.4; 184/6.26
[58] Field of Search .................................. 700/83, 84, 85, 700/87, 88, 17, 46, 244, 254; 239/4, 5, 6, 7, 8; 184/6.1, 6.4, 6.26

[56] References Cited

U.S. PATENT DOCUMENTS

| | | | |
|---|---|---|---|
| 3,191,718 | 6/1965 | Haywood | 184/1 |
| 3,709,433 | 1/1973 | Obergefell et al. | 239/8 |
| 3,918,640 | 11/1975 | Piccino et al. | 239/4 |
| 3,939,944 | 2/1976 | Mitchell et al. | 184/6.26 |
| 3,952,566 | 4/1976 | Jacobson | 73/10 |
| 3,967,549 | 7/1976 | Thompson et al. | 101/1 R |

(List continued on next page.)

FOREIGN PATENT DOCUMENTS 3638714  5/1987  Germany .

OTHER PUBLICATIONS

AMOT Controls Product Brochure Form 1339, Model 8630 Hawk–I™, AMOT Controls Corp., 1997.
Alemite Oil–Mist Automatic Lubrication Systems, Catalog 603, Apr. 1995, pp. 1–28.
Alemite Stewart–Warner Service Instructions, Oil–Mist Consoles, Series 3760–A1 and 3761–A1, Sep. 1984, pp. 1–55.
LubriMist™ 'SSV' Solid State Oil Mist Console, Bulletin No. 4–1092–1,1992, pp. 1–4.
Alemite ™ Service Instructions, Oil–Mist Generators, SER 4977–A6, Alemite Corporation Dec. 1993, pp. 1–29.
Operating and Instruction Manual, LubriMist® Oil Mist, Model SSV, Solid State Oil Mist Console, Aug. 1990, pp. 1–106.
Alemite Product Literature, New Electronic Oil–Mist Monitor, Model 3770, Alemite Division, Stewart–Warner Corporation, 1986, pp. 1–2.

*Primary Examiner*—Paul P. Gordon
*Assistant Examiner*—Ramesh Patel
*Attorney, Agent, or Firm*—Moore & Van Allen, PLLC; Michael G. Johnston

[57] ABSTRACT

An oil mist generating system and monitoring method is shown and described, including pressurized air and oil supplies connected to a mist generating head. Sensors are provided for monitoring current values of the system operating parameters and for generating data signals based on the monitored values. A data processor functionally connected to the sensors generates signals based on the data input, such as an alarm signal if one of the monitored values is beyond the extremes of a predetermined range of values indicative of a fault condition. A visual display device displays programmed messages based on the signals generated by the data processing means. If a fault condition exists, the displayed messages aid the user in diagnosing and correcting the reason for the alarm signal. The user may manually request further programmed messages using a keypad, which messages direct the user to take predetermined actions to troubleshoot the problem and maintain the system at an appropriate operating level. The data processor also initiates or terminates steps in a system start-up sequence in response to the monitored values. A computer-compatible, two-way communication port is also provided for two-way communication between the system and a remotely located computer. The system and method thus guides a user through a safe, effective start-up and provides on-line troubleshooting while monitoring operation. The oil mist generating system may also include a stand-by unit having a mist generating head, wherein the regular and stand-by units share common connections to air supply, oil supply an mist outlets. Three-way valves for controlling the connections providing for a simple and safe switch-over to the stand-by unit during times of temporary shutdown.

34 Claims, 12 Drawing Sheets

U.S. PATENT DOCUMENTS

| | | | |
|---|---|---|---|
| 4,064,455 | 12/1977 | Hopkins et al. | 324/61 R |
| 4,184,205 | 1/1980 | Morrow | 364/508 |
| 4,284,239 | 8/1981 | Ikeuchi | 239/8 |
| 4,312,424 | 1/1982 | Taylor et al. | 184/6.4 |
| 4,445,168 | 4/1984 | Petryszyn | 364/140 |
| 4,527,661 | 7/1985 | Johnstone et al. | 184/6.1 |
| 4,535,851 | 8/1985 | Kirkpatrick et al. | 175/38 |
| 4,637,493 | 1/1987 | Ehlert | 184/55.1 |
| 4,726,191 | 2/1988 | Kawamura | 60/641.7 |
| 4,735,286 | 4/1988 | Miki et al. | 184/64 |
| 4,937,764 | 6/1990 | Komatsu et al. | 364/558 |
| 5,038,893 | 8/1991 | Willner et al. | 184/7.4 |
| 5,041,990 | 8/1991 | Yabumoto et al. | 364/510 |
| 5,058,709 | 10/1991 | Saam | 184/108 |
| 5,540,959 | 7/1996 | Wang | 427/561 |
| 5,904,756 | 5/1999 | Fujii et al. | 96/188 |
| B1 5,125,480 | 4/1995 | Gregory et al. | 184/6.26 |

OIL MIST GENERATING SYSTEM AND METHOD

CROSS REFERENCES

None

GOVERNMENT RIGHTS

None

BACKGROUND

This invention relates generally to an oil mist generating system, and more particularly concerns an oil mist generating system and method for system start-up and monitoring.

Centralized mist generating systems are used to provide an oil mist for continuous lubrication of multiple pieces of machinery. Oil mist generating systems generally include a pressurized inlet gas supply, an inlet oil supply feeding into an oil reservoir, a mist generating head on the reservoir, and instrumentation for monitoring and controlling the operating conditions of the system. Using the energy of pressurized gas, oil is atomized into very fine particles at the mist generating head. The oil mist is conveyed long distances in the gas stream and directed to machinery parts for lubrication. Oil mist lubrication is used to lubricate all kinds of machine elements ranging from tiny, ultra-high speed parts of dental drills to huge chains, cams, gears, bearings and other moving machine parts.

In the past, oil mist generating systems were provided with minimal instrumentation for monitoring and control. More recently, attempts have been made to upgrade the monitoring and control of such systems. Built-in, solid-state programmable control units for oil mist generating systems are now available. However, monitoring and control of oil mist generating systems remains a concern among users and an area where needs still exist. Even when solid-state monitoring and control are available there is still a need to enhance the overall user-friendliness of the system. Problems particularly persist in the area of system start-up, troubleshooting (finding and correcting faults), and changeover to stand-by systems when necessary and available.

Monitoring and control of oil mist generating systems during start-up has been inadequate to date. When an oil mist generating system is initially turned on, the air and oil are cold and will not produce mist for lubricating machinery. Of course, mist must be available when the machinery is turned on or the equipment may be damaged. Unforeseen situations may also arise during start-up which place the user and system at risk, particularly since the oil is heated and under pressure. Moreover, many oil mist generating systems are located in hazardous areas which enhances the dangerous circumstances. Unfortunately, users presently start conventional oil mist generating systems with little meaningful input from the system instrumentation. Conventional solid-state monitoring and control systems are not capable of guiding the user through a start-up sequence for the system. Typically, the system operating manual serves as a guide for start-up, but more often the user relies on general system experience.

Once the oil mist generating system is running, routine maintenance accompanied by monitoring for system faults are ordinarily all that is needed. Minor adjustments are ordinarily not necessary. However, when faults occur, conventional oil mist generating systems lack an automated approach for dealing with the problem. Usually, only a general fault condition is indicated leaving to the user the task of diagnosing and correcting the problem. Again, the only useful reference source is the operating manual or the user's own experience. Even after the reason for the fault condition is identified, the user must still decide how to address the problem. Present systems do not offer the user such guidance outside of the operating manual. Moreover, since oil mist generating systems are used in industrial settings, such as refineries and textile factories, downtime can be extremely costly, particularly if the fault is not diagnosed quickly. Failure of the system may result in the destruction of high cost equipment. Thus, efficient troubleshooting is important.

Stand-by units are an added option in an overall oil mist lubrication system. When a regular oil mist generating unit is out of service due to a malfunction or maintenance, the user temporarily switches operation to the stand-by unit. This is accomplished by using multiple two-way valves to turn off the air and oil sources of the regular unit and close the mist outlet, and then turning on the corresponding two-way valves of the reserve unit. Unfortunately, piping for the combined regular and stand-by system configuration is complicated. Also, the opportunity for error is significant, especially if the valves are not closed or opened in the proper sequence.

For the foregoing reasons, there is a need for improved monitoring and control of the operation of oil mist generating systems. An automated start-up sequence for oil mist lubrication generating systems is needed which, at a minimum, ensures that start-up proceeds properly and that mist is available before the machinery to be lubricated is turned on. The automated start-up should ideally provide guidance for the user contributing to the safety of the user, the system, and the machinery. There is also a need for improved troubleshooting of oil mist generating systems. Means are needed to quickly identify oil mist generating system malfunctions and speed diagnosis and correction. When temporary switching to a reserve unit is necessary, there is a need to simplify the configuration and piping and thus lessen the opportunity for error that might cause improper changeover and possible damage to the lubricated machinery.

SUMMARY

The present invention is directed to an oil mist generating system and monitoring method that satisfies these needs.

An oil mist generating system having features of the present invention comprises means for supplying pressurized air and oil, the oil supply means including a reservoir for liquid oil; means for generating a mist of oil connected to the pressurized air and oil supply means; a plurality of sensors for monitoring current values of the air and oil temperatures, the oil level in the reservoir and the mist pressure, and for generating data signals based on the monitored values; data processing means functionally connected to the sensors for generating a signal; a visual display device for displaying programmed messages on the visual display device based on the signal generated by the data processing means; and means responsive to a manual user inquiry for visually displaying on the visual display device programmed messages directing the user to take predetermined actions to maintain the system at an appropriate operating level. The signal generated by the data processing means may be an alarm signal if one or more of the monitored values is beyond the extremes of a predetermined range of values, in which case the displayed suggestions are for diagnosing and correcting the reason for the alarm signal. The data processing means may also initiate or terminate steps in a start-up sequence for the system in response to the monitored values.

A method for monitoring an oil mist generating system having features of the present invention comprises the steps of supplying pressurized air and oil to a mist generating means and generating mist; monitoring current values of the air and oil supply temperature and the mist pressure; generating a data signal based on the monitored values, processing the data signals and generating a signal responsive to the monitored values, such as an alarm signal if one of the monitored values is outside a range of allowable current values; providing a visual display device; and displaying pre-programmed messages on the visual display device for directing the user to take predetermined actions for maintaining the system at an appropriate operating efficiency. The method may also comprise the step of initiating or terminating steps in the start-up sequence of the system in response to the monitored values.

Another embodiment of an oil mist generating system having features of the present invention comprises means for supplying pressurized air and oil, two separate means for generating mist sharing a common connection to the air supply means, and a three-way valve for controlling the air supply to the mist generating means.

Accordingly, it is an object of the present invention to provide a new oil mist generating system and monitoring method having one or more of the novel features as set forth above or hereinafter shown or described.

Another object of this invention is to provide an automated start-up sequence for an oil mist generating system which guides a user through a safe, effective start-up.

A further object of the present invention is to decrease the time necessary to diagnose system fault conditions and direct the user through the correction of the reason for the fault.

Still another object of the present invention is provide a stand-by unit having means for a simple and safe switch-over during times of temporary regular shutdown.

Generally speaking, the present invention meets these objectives and overcomes the drawbacks of conventional mist generating systems by providing sensors, a microprocessor for processing data inputs from the sensors and an operator interface including a visual display and keypad. The keypad allows user access to the monitored values and to request pre-programmed messages for troubleshooting the system. A computer-compatible communication port, such as an RS 422/485 port, is also provided for two-way communication between the system and a remote location.

During start-up, the microprocessor is responsive to the operating conditions of the system to initiate or terminate events until the system reaches operating efficiency. During operation, the microprocessor detects irregularities characteristic of "faults" exceeding high and low set points limits which are generically characteristic of steady-state operation. The key pad allows the user to interactively query the unit for the operating condition causing the fault and the present value of the condition. Continued querying suggests possible causes for the fault condition. For simplicity and ease when switching to a stand-by unit, the system is further enhanced using three-way valves at common connections for air and oil sources and mist outlet.

Thus, the present invention guides the user safely and efficiently through start-up. On-line troubleshooting speeds problem diagnosis during operation and minimizes down-time. Moreover, since the system automatically guides the user through the operation, it relieves the user of much of the burden of safe and efficient operation.

BRIEF DESCRIPTION OF THE DRAWINGS

For a more complete understanding of the present invention, reference should now be had to the embodiment illustrated in greater detail in the accompanying drawings and described below by way of an example of the invention.

In the drawings.

DESCRIPTION

Figure 1:
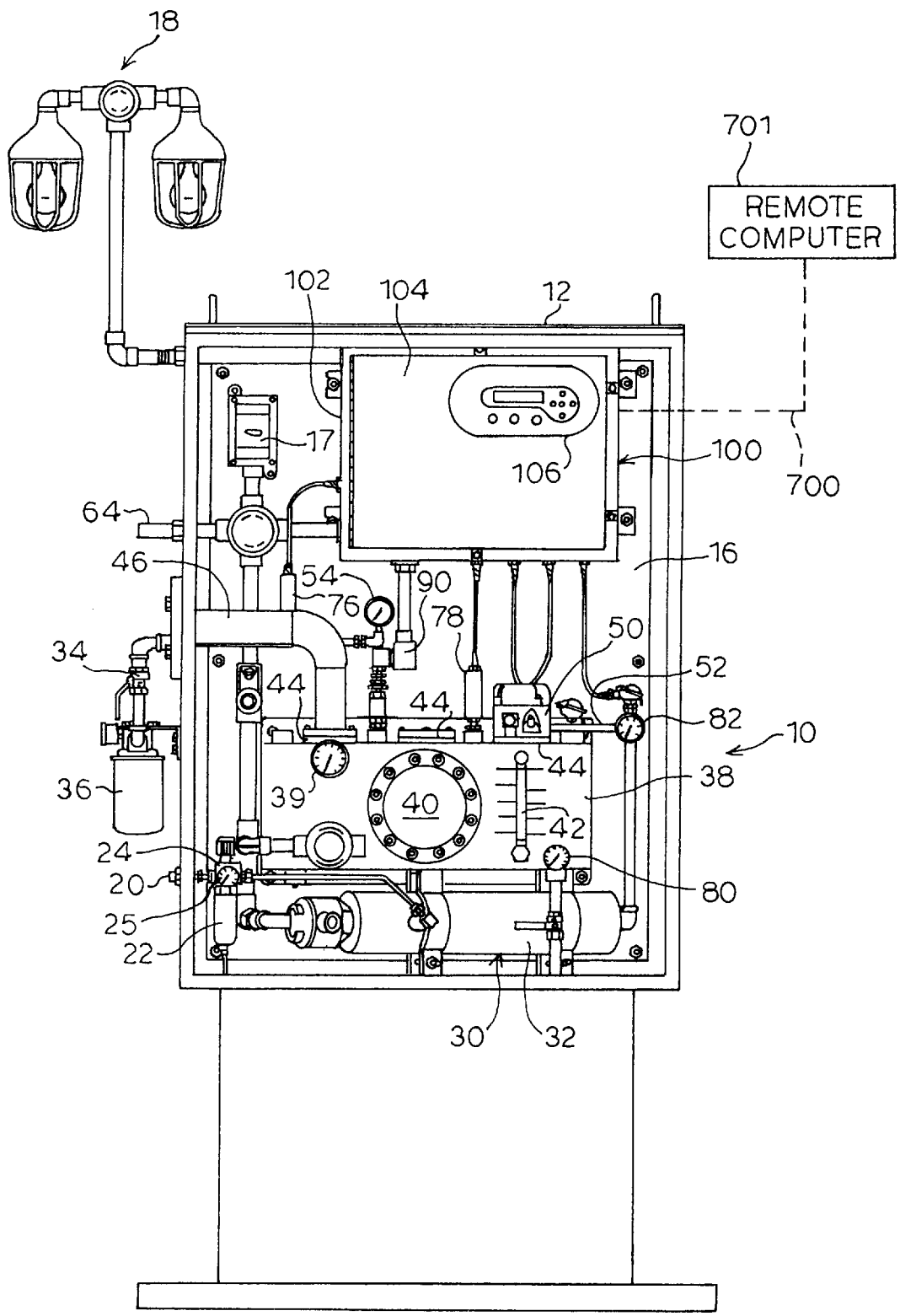
FIG. 1 is an elevational view of an oil mist generating system cabinet, housing the components of an oil mist generating system.

Referring first to FIG. 1, there is shown an embodiment of an oil mist generating system according to the present invention, generally designated at 10, which is available from Alemite Corporation, Charlotte, N.C., U.S.A. It is understood that our method for oil mist generation may be applied to any mist generating system. For the purpose of this description, the method of the present invention will be described in detail with reference to the oil mist system shown in FIG. 1. However, we do not intend to be so limited.

All system components are housed within a metal cabinet 12. The cabinet 12 has weather-sealed doors 14 (FIG. 2) and is designed to be suitable for both indoor and outdoor industrial environments. A building block for the system is a back panel assembly 16 which can be easily configured for different applications and is universal for all systems. A sealed disconnect switch 17 (FIG. 1) is provided in the cabinet for controlling electrical power supply to the system components. The electrical circuitry is not disclosed herein because it would add needless complexity and can be provided easily by one of ordinary skill in the art given the general purpose and desired operation of the system. The cabinet 12 is shown equipped with two external lamps 18, one green and one red, that constantly indicate condition of the unit. Normal, satisfactory operation is indicated by green light turned on and red light turned off. Red light turned on and green light turned off indicates a system fault condition.

The oil mist generating system 10 includes a source of pressurized gas and an oil supply source, both of which are conventional and neither of which is shown. The pressurized gas is generally air or nitrogen. For the purpose of this description, it will be assumed that the pressurized gas is air supplied at an air supply inlet 20 which is connected to the source of pressurized air, such as instrument air, an air compressor or the like. From the air supply inlet 20, the pressurized inlet air initially passes through an air filter 22 where the inlet air is filtered and most of the moisture content removed. The clean dry air then flows through an air pressure regulator 24 for controlling the system operating pressure. A gauge 25 visually indicates the regulated air supply pressure, which is typically from about 2 psi to about 100 psi. An air heater 30 is provided to heat the inlet air, as needed. The air heater 30 typically includes a chamber 32 which houses an air heater element. The air heater 30 maintains the air temperature at about 100° F. As is well-known in the art, heating the air ensures a near constant flow rate of air and oil mist and stabilizes the mist density (oil-to-air ratio) despite varying ambient temperatures. Heating the air also facilitates the misting of heavy oils at lower ambient temperatures.

Oil is supplied through an oil supply inlet 34 and an oil filter 36 and into an oil reservoir 38. Inlet oil supply pressure is visually indica ted on a pressure gauge. The oil reservoir 38 is mounted directly to the back panel 16. The front of the reservoir 38 has a flange-mounted clean-out port 40 and a sight gauge 42 for viewing the level of the liquid in the reservoir 38. Different size oil reservoirs may be used, ranging from as small as one pint to several gallons. The reservoir 38 may have an oil heater for maintaining the oil at a temperature of about 100° F.

FIG. 1 shows a mist generating head 50 mounted on a connection port 44 on top of the oil reservoir 38. An air supply conduit 52 carrying filtered, regulated and heated air is connected to the side of the mist generating head 50. The function of the mist generating head 50 is to combine oil and air so as to generate oil mist. The air stream generates the oil mist in the generating head 50. The mist exits the head 50 above the oil in the reservoir 38, floats across the top of the reservoir and exits an outlet port 46 and is propelled through a mist distribution pipeline for lubricating machinery.

Conventional mist generating heads and oil reservoirs may be used in accordance with this invention. However, the preferred oil mist generating head and reservoirs are shown and described in co-pending U.S. patent application Ser. No. 08/651,826. As described therein, the preferred mist generating head 50 includes all of the components necessary to the mist generating system. Each reservoir 38 has an identical mist head connection port 44, regardless of its size, so that the mist generating head 50 may be used on any size reservoir 38. Larger oil reservoirs have multiple ports. For example, the five-gallon reservoir 38 shown in FIG. 1 provides up to six connection ports 44 for multiple mist heads. Only the front three connection ports 44 are visible in FIG. 1. Having several mist head connection ports 44 provides locations for mounting "special purpose" heads designed for unique system functions. Such special purpose heads include, for example, an automatic refill head having an oil level switch and reservoir filling port; an instrument head carrying gauges, sensors and the like for monitoring system operation; a heating head having heaters for heating the oil; and an oil supply inlet head with filters. Also, as seen in FIG. 1, when multiple ports are available, one of the connection ports 44 may be used as a large diameter oil mist outlet port 46 for high volume mist output.

Figure 2:
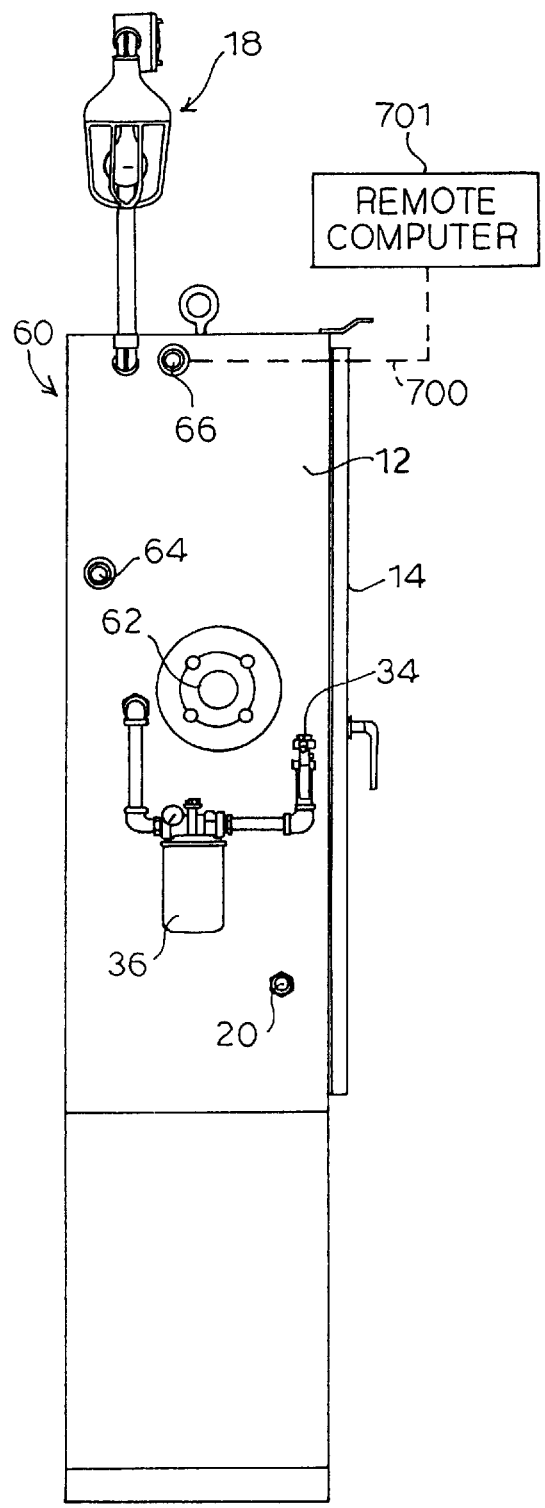
FIG. 2 is an elevational view of the left face of the oil mist generating system cabinet, as shown in FIG. 1.

The sides of the cabinet 60, 70 are shown in FIG. 2. Openings are provided in one side of the cabinet 60 (FIG. 2) for utility connections, including a mist outlet port 62, an electrical power inlet 64, an electronic signals port 66, and compressed air inlet 68.

The operating conditions of the oil mist generating system are continuously monitored using sensors, switches, and the like. Pressure sensors, such as transducers, are provided for monitoring inlet air supply pressure and regulated air supply pressure, oil pressure 76 and mist pressure 78. The oil level in the reservoir is monitored using a level switch (not shown), such as a float-type switch which, in the preferred embodiment, is connected to the mist head 50. Oil temperature 80, air temperature 82, and mist temperature are monitored with thermocouples, resistance/temperature devices or transmitters, thermometers and the like. A mist detector (not shown), which is usually a photo-optical device, may also be provided for monitoring mist density.

Along with monitoring, the sensors may also provide operating signals to initiate events for changing the monitored operating parameter in response to the monitored values. For example, thermostats operate cyclically in energizing the air and oil heaters for maintaining the air and oil temperatures at about 100° F. In an automatic reservoir refill configuration, oil flow into the reservoir 38 is automatically controlled by the float switch which operates an oil supply solenoid valve 90 through a relay. As oil is consumed, the float switch provides a control signal to the solenoid valve to open and then close the valve and thus automatically control reservoir 38 refill. Other operating variables which may be automatically controlled include the mist pressure, mist density, regulated air pressure, mist temperature and inlet oil pressure. Signals based on the monitored operating conditions of the system may also be used to generate termination commands for disabling certain components so as to protect the system in the event of certain conditions. For example, over-temperature protection circuits operate high temperature cut-off switches for both the air heater and oil heater.

Mechanical gauges are provided for redundancy of information, manual operation during times of electrical problems, and to ease trouble shooting by mechanically-oriented personnel. These gauges also serve a safety purpose by reminding the user of the temperature and pressure conditions of the system. The gauges may include, but are not limited to, a pressure gauge located on the oil inlet filter 36, a pressure gauge 54 located in the oil intake line adjacent to the solenoid valve 90, a mist pressure gauge 39 located in reservoir 38, the oil level gauge 42, an oil temperature gauge 80 located in reservoir 38, the air pressure gauge 25 located on the filter/regulator 24 and a heated air temperature gauge 82 located near the mist head 50.

According to the present invention, a data processing assembly 100 is provided for receiving and generating signals and information based on the monitored system operating conditions. The data processing assembly 100 is contained within a housing 102 inside of the cabinet 12. The housing 102 includes a hinged front access panel 104. The electronic circuitry of the data processing assembly 100 is disposed within the housing 102 and comprises a microprocessor-based annunciator 106 and power relay components (not shown). The front panel 104 of the housing 102 holds the annunciator 106 and the back panel of the housing 102 holds the power relay components.

The data processing assembly 100 continuously receives and processes input signals from the sensors monitoring the system. Sensor output signals are fed into the data processing assembly 100 on lines that usually carry an analog voltage or current signal that is proportional to the measured parameter. The signals are digitized or otherwise sampled and processed by the microprocessor-based annunciator 106, as described below. As contemplated herein, the microprocessor-based annunciator 106 is a solid-state system which is programmed to provide general process information to the user. As with any conventional microprocessor-based monitor/control system, the hardware and electrical connections are conventional, and the applications are programmed to control the microprocessor so as to provide the features and functions described below in connection with FIGS. 5A to 5H. A suitable microprocessor-based annunciator is available from AMOT Controls Corporation of Richmond, Calif., U.S., as Model-8630.

Figure 3:
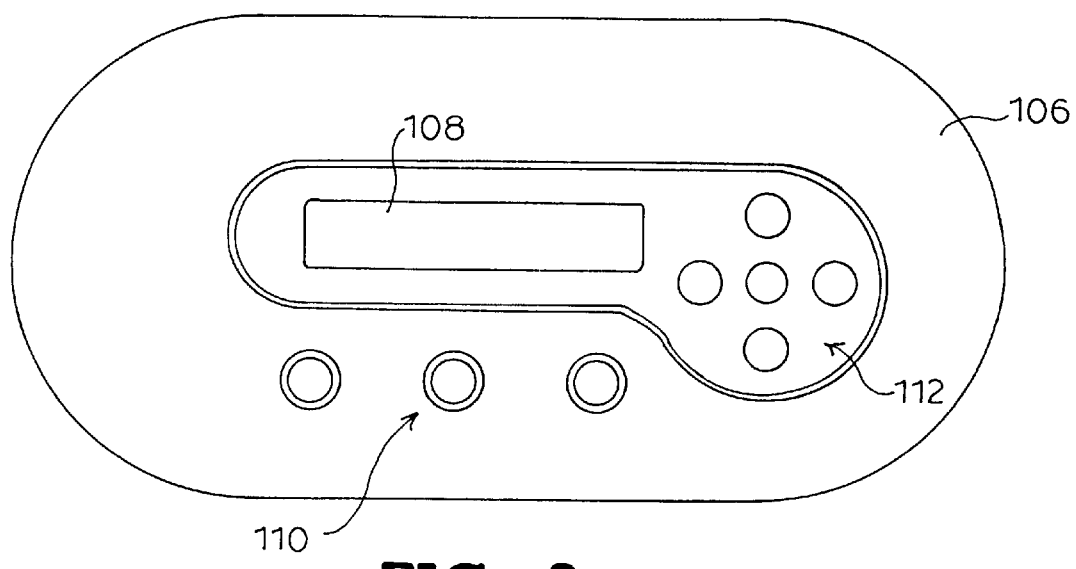
FIG. 3 is an elevational view of a data processing means and display device in accordance with an embodiment of the present invention.

As seen more easily in FIG. 3, an alpha-numeric display screen 108 displays annunciator-generated messages and selected information when prompted. Preferably, the display 108 can function in different languages using text messages or use symbols, icons, or the like as a universal language. It is understood that the particular words used to denote system status are not otherwise critical and are offered below only as examples. Other words or symbols conveying the same information may be used without deviating from the scope of our invention.

The annunciator 106 includes a keypad 110 which is accessible from the front of the housing 102. The keypad 110 has a plurality of buttons for supplying user-initiated data to the microprocessor. The functions of keys are assigned by the program used to operate the data processing assembly 100. When pressed, a key will perform the assigned function. Similarly the function of the key grouping 112 having an enter key surrounded by four buttons will change depending on the programming and the embedded commands. Using the keypad, the user can query the unit for process information, including the present value condition of any of the monitored operating parameters.

In the system and method of the present invention, the data processing assembly 100 generally operates to compare the monitored operating condition values to predetermined maximum or minimum setting values for each of the monitored operating variables. A limit-setting window may also be activated when queried. A conventional display code can be readily used to activate the display screen 108 to display the predetermined limit conditions described above, when prompted. The user would then have the option of changing the limit values within a factory-preselected range.

When an operating variable is outside of the predetermined range, the microprocessor-based annunciator 106 automatically provides a warning signal. As noted above, general present condition information is provided using the green light or the red light 18, a fault condition being indicated when the red light is on. Thus, a red warning signal is visible to the operator when the microprocessor turns the red light on. However, other means for signaling a fault condition may be provided including, for example, an audible signal and a message on the display screen 108. In an alarm situation, the user may query the system by manipulating the buttons of the keypad and sequentially stepping through the sensor-based and programmed information. The query process selectively displays the present values of the monitored operating conditions as well as suggested troubleshooting steps, all to relieve the operator/user from having to study the operating and troubleshooting manual.

In keeping with the invention, the microprocessor functions to provide a programmed start-up sequence which guides the system and user through start-up and includes safety interlocks to insure that start-up is satisfactory and safe. A start-up logic sequence according to the present invention, generally designated as 200, is shown in FIGS. 5A to 5E. The start-up sequence 200 begins on FIG. 5A with a power-on step 202, initiating the electric power and continues with a system-test initiation step 204. The step after the system-test initiation step 204 is step 203 which assures that both of the external indicator lamps 18 (one red and one green) are off. At about the same time, the step 205 causes the display screen 108 (FIG. 3) to display "SYSTEM TEST." A ten-second delay step then assures that both of the lamps 18 are clearly observed by the user to be off. The operator can watch the red and green status lamps 18 (FIGS. 1 & 2) as the test sequence proceeds.

After the ten-second delay step 207, the program sequence turns on the red light in the program step 209 and causes the display screen 108 to display "RED LIGHT ON" in a nearly simultaneous step 210. A competent programmer will understand that many of the steps of the present program sequence (such, for example, as steps 209 and 210) are simultaneous or nearly so and thus interchangeable or combinable in the sequence.

Another ten-second delay step 211 keeps the red lamp on long enough for the user to see that it is operating satisfactorily and to compare it with the "RED LIGHT ON" message on the display screen 108. At the end of the ten-second delay of the step 211, program step 213 turns off the red lamp, and a step 214 causes the display screen 108 to display "RED LIGHT OFF."

The next step 216 causes the green lamp to be turned on, and the step 218 causes the display screen 108 to display "GREEN LIGHT ON." A ten-second delay step 220 gives the user/operator time to notice that the green lamp is on and to note the "GREEN LIGHT ON" message on the display screen 108. After the ten-second delay of the step 220, the steps 222 and 224, sequencing through transfer circle 223 to FIG. 5B, turn off the green lamp and display "GREEN LIGHT OFF" on the display screen 108.

After the testing of the red and green lamps 18, the program sequence progresses to a decision step which is a part of the program sequence which causes the oil level in the oil reservoir 38 (FIG. 1) to be examined and evaluated. The oil reservoir 38 preferably has a three-level float switch wherein each float comprises a sensor. That is, the first or upper level sensor senses if the oil reservoir is too full. That upper sensor causes a high level alarm signal and turns off the refill pump; because, the oil reservoir has excess oil. A second or mid-level sensor of the set senses if the oil level is low enough to warrant opening the oil-fill valve and adding a little oil to the reservoir 38. Adding too much oil at once could chill the oil enough to impair misting. The second or mid-level sensor is a magnetic reed switch (not shown) controlled by a permanent magnet on a float and operates to control the admission of the small amount of oil so as to maintain the normal, desired level of oil in the reservoir. The reed switch closes and opens within a "dead band" or narrow hysteresis zone so as to maintain the oil level within a very narrow range (preferably about ¼-inch). A third or low-level sensor of the set senses if the oil level is so very low as to constitute an emergency because of a serious risk that the oil supply in the reservoir 38 will be exhausted before steps can be taken to protect the machinery that is being mist lubricated.

The decision step 226 senses the first oil level sensor of the set and determines if the oil level in the reservoir 38 is too high. If, YES, the oil level is too high, a step 228 causes "TOO MUCH OIL" to appear on the display screen 108. At the same time, a step 230 turns on the red lamp 18; and a step 232 stops the program sequence. The user/operator will notice the red lamp 18 and glance at the display screen 108 and observe "TOO MUCH OIL." The user/operator can then query the microprocessor's database, at program step 234 for suggestions and diagnostic aids, e.g., ascertain if the oil level is clearly above the high level alarm point. It is to be understood that the diagnostic aids obtained from the database are not intended to be all inclusive and other diagnostic suggestions for each condition may be used. Preferably, the diagnostic aids proceed in an order based on the probability of the causes of the problem, beginning with the most likely cause.

If the oil level is at the upper limit, the database might suggest troubleshooting the first sensor and the reservoir oil inlet solenoid valve to ascertain if the second sensor is defective or if the reservoir oil inlet solenoid valve is leaking. If the solenoid valve is leaking, replace it. If the oil level is at the upper limit, and the operator can fix the problem, the operator can then merely command the program to continue its sequence after the problem has been fixed. The next step 236 turns off the red lamp and assures that both lamps 18 are off.

Figure 5A:
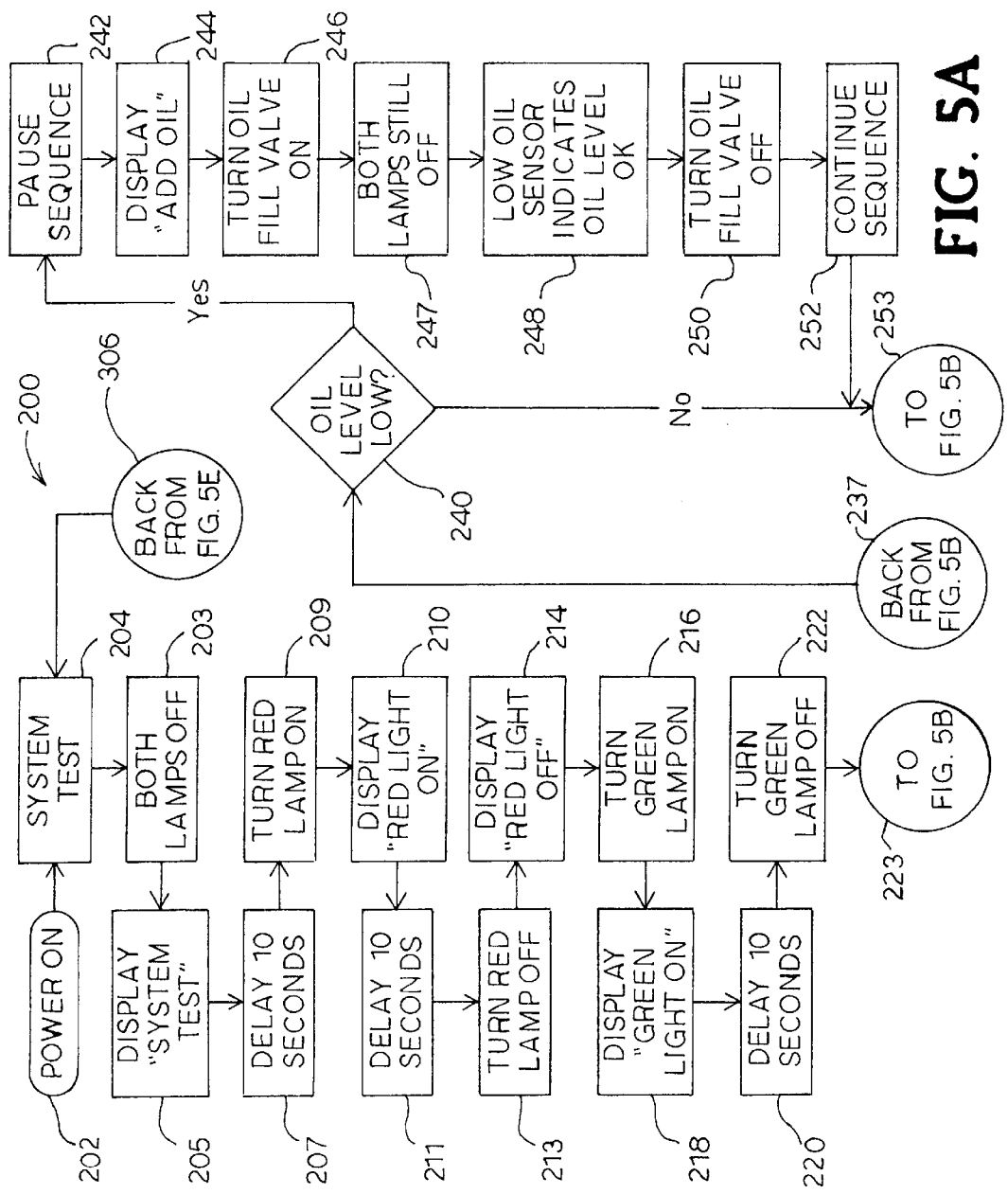
FIGS. 5A, 5B, 5C, 5D and 5E is a flow diagram of an embodiment of an automated start-up sequence according to the present invention.

After the lamps-off program step 236 or if, NO, the oil level had not been too high in the decision step 226, the program sequence 200 then progresses to the decision step 240, sequencing through transfer circle 237 to FIG. 5A, at which the second mid-level sensor of the set determines if the oil level in the reservoir 38 is too low. If, YES, the oil level in the reservoir 38 is below the add-oil level, the program sequence is stopped in the program step 242 for a pause to refill the reservoir 38. At or about the same time, the program step 244 instructs the display screen 108 to display "ADD OIL." At the same time the step 246 opens the solenoid valve to add oil to the reservoir. Meanwhile, both of the lamps 18 are off, step 247, so the operator knows that the program sequence is automatically adding oil; and no manual action is needed. When, at the next program step 248, the second sensor indicates that the oil level is now at or above the add-oil level, the step 250 causes the oil fill valve to be turned off. At the step 252, the program sequence is continued.

Figure 5B:
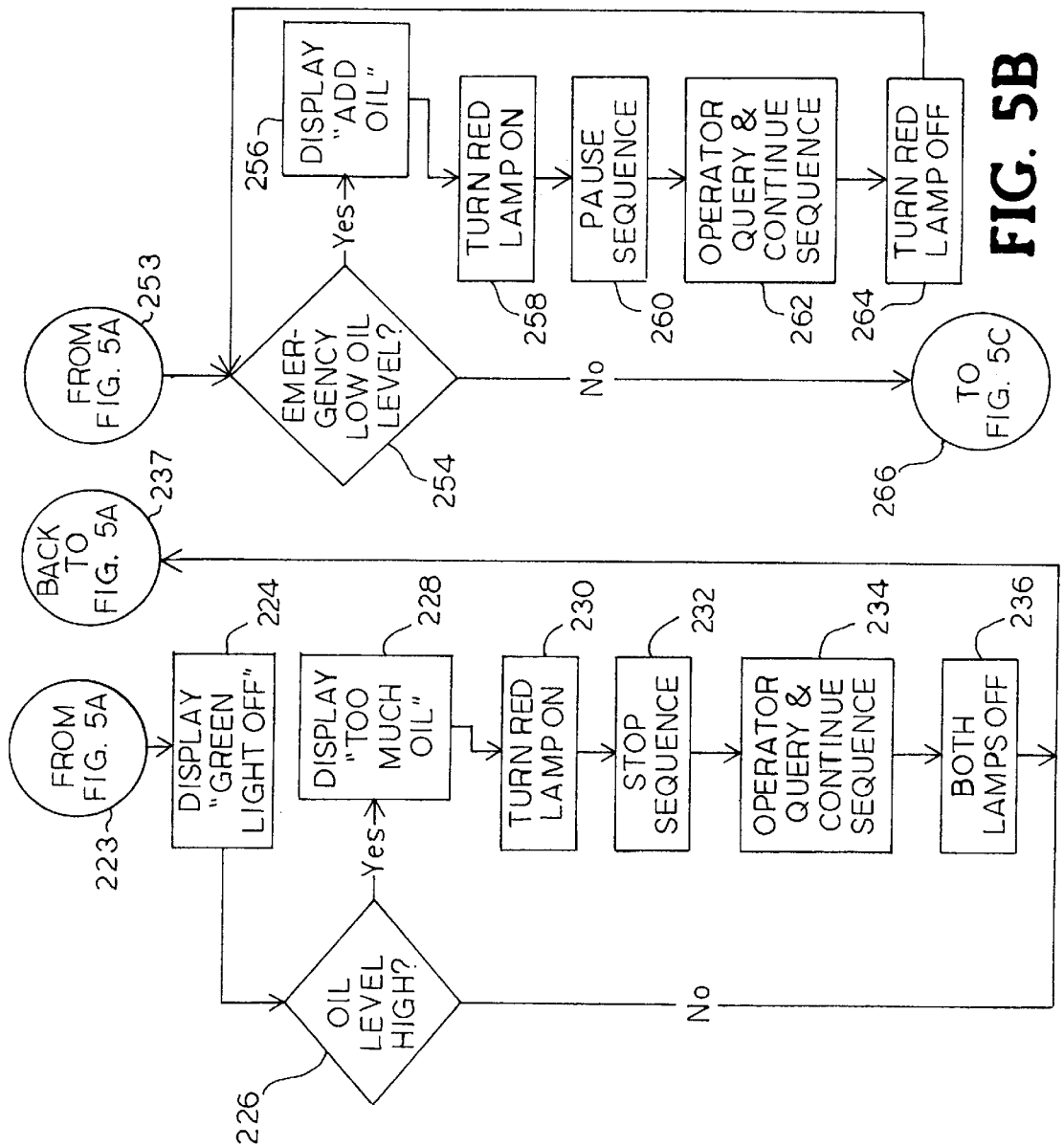

When the program sequence continues after the step 252 or if the decision step 240 had resulted in a NO output at the low-oil level decision 240, the program advances to an emergency-low-oil level decision step 254, sequencing through transfer circle 253 to FIG. 5B, at which the third low level sensor of the set determines if the oil level in the reservoir 38 is dangerously low. This test is as much to check for correct operation of the second sensor as to check for correct operation of the third sensor. If the decision step 254 determines if the oil level is dangerously low, it causes the display screen 108 to display "ADD OIL" in a step 256. The red lamp is turned on in a step 258. The program sequence is paused in a step 260. Because the red lamp is illuminated, when the operator sees "ADD OIL" on the display screen 108, it is evident that the operator must tend to the problem. A query of the microprocessor's database, at the program step 262, will probably tell the operator to trouble shoot the second and third sensors of the float-switch while adding oil to the oil reservoir 38, manually, most likely. When the operator is satisfied that the second and third sensors of the set are both functioning properly and that the reservoir 38 has enough oil, the operator will manually instruct the microprocessor to continue the program sequence at the program step 262. At the program step 264, the red lamp will be turned off; and the program sequence will feed back to the input to the decision step 254, to be sure that emergency low oil level is no longer a problem.

Figure 5C:
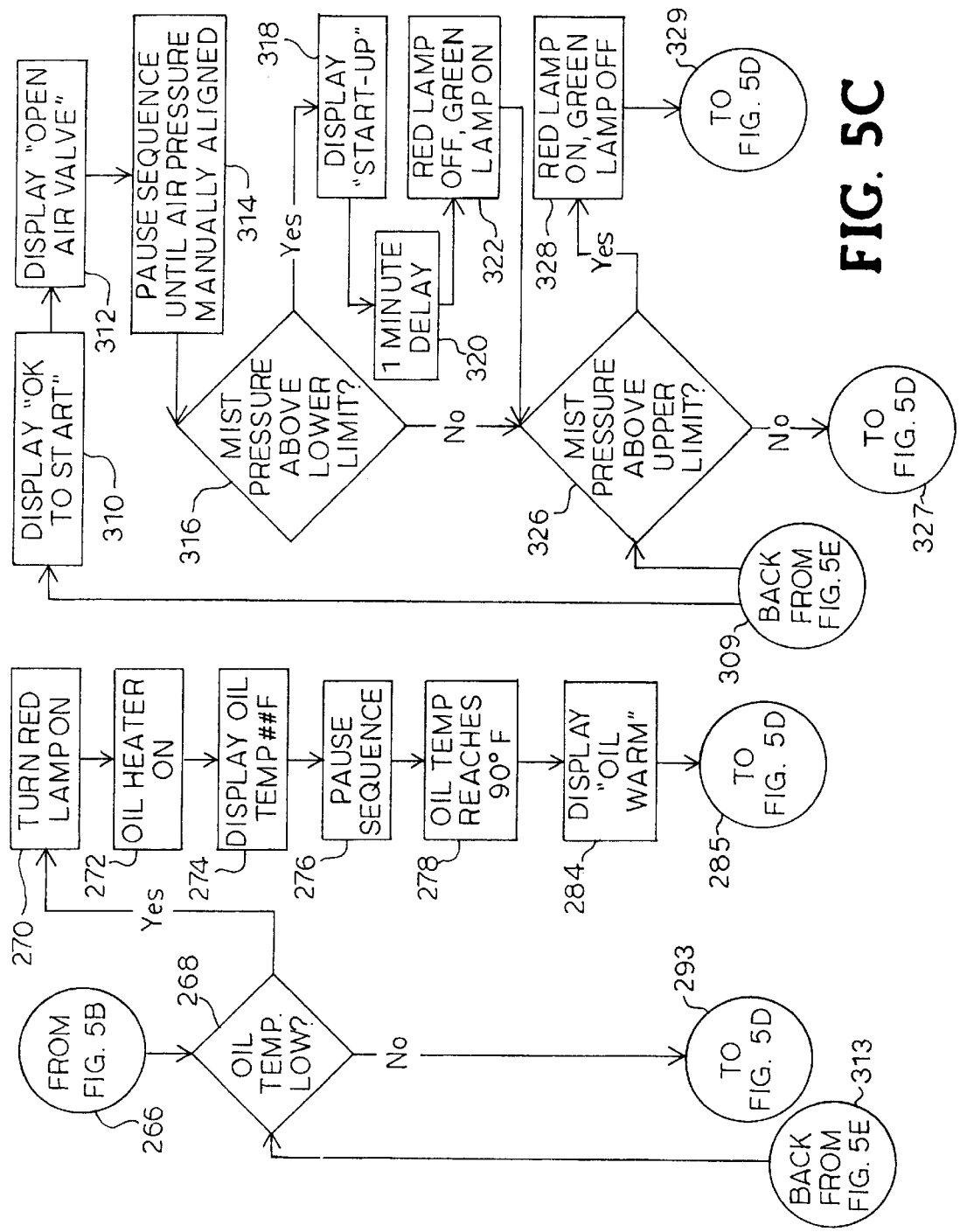

When the decision step 254 indicates that, NO, there is not an emergency low oil level, the sequence continues through a transfer circle 266 to FIG. 5C to a decision step 268, at which an oil-temperature sensor is interrogated. If the oil temperature is below a predetermined lower set point (e.g., 90° F.), the data processor executes a step 270 wherein the red light 18 is turned on. At or near the same time, a program step 272 energizes the oil heater and another program step 274 sends the display oil temperature signal to the display screen 108 so that the display screen 108 initially indicates the present oil temperature, for example, "OIL TEMP ##".

The system then pauses at a program step 276 while the thermostatically-controlled oil heater warms the oil. The oil temperature is sensed in program step 278 to have reached the predetermined lower set point (e.g., 90° F.). The next program step 284 causes "OIL WARM" to be displayed on the display screen 108, and, the sequence continuing through transfer circle 285 to FIG. 5D, a program step 286 turns off the red lamp 18. A program step 288 then cause the microprocessor to continue with the program sequence.

Figure 5D:
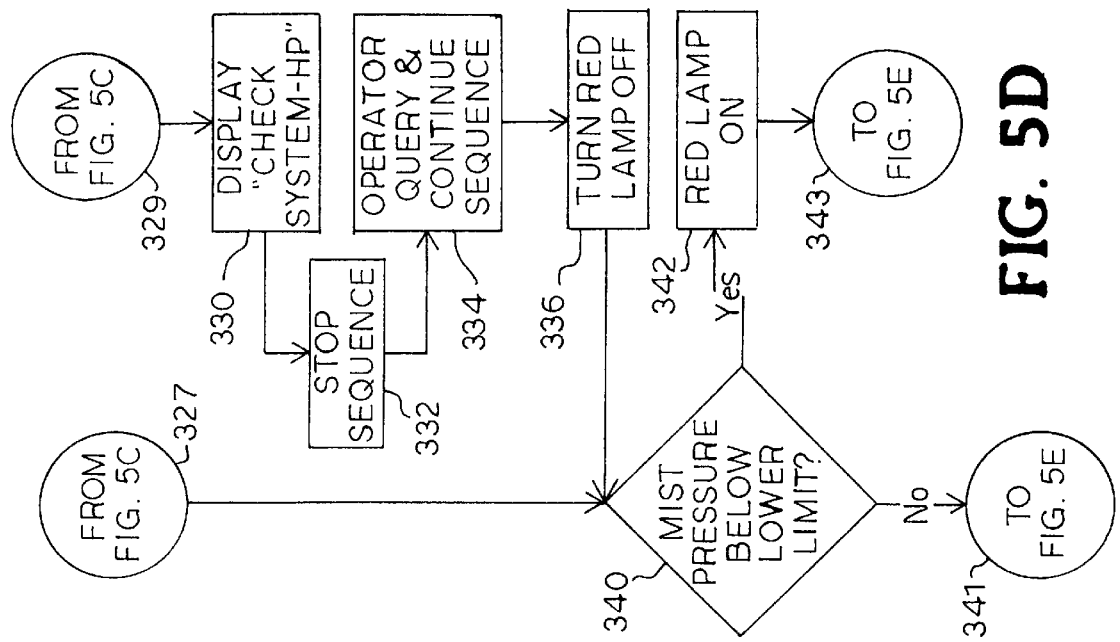
Figure 5D:
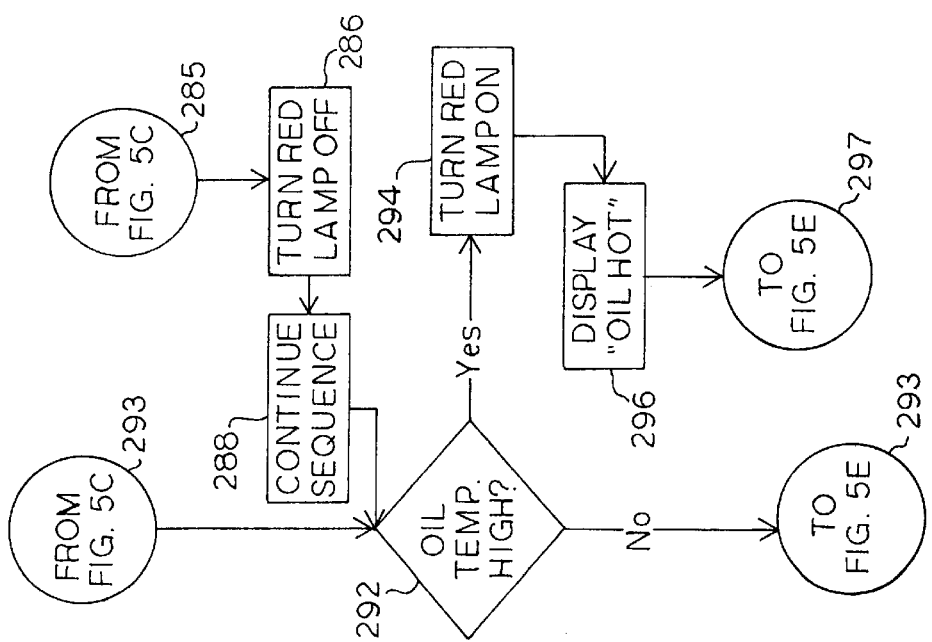
Figure 5E:
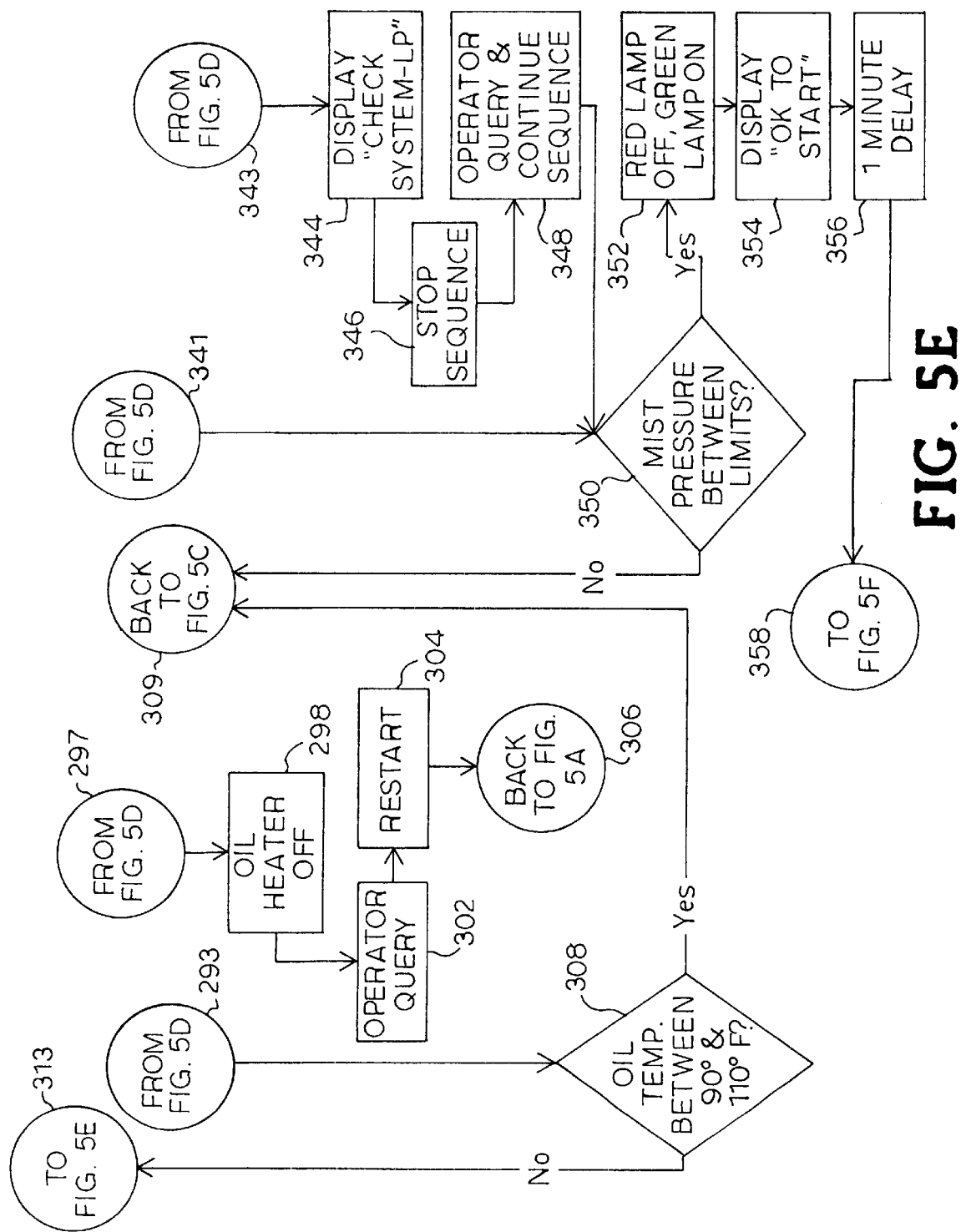

After the oil has been sufficiently heated or if the oil had initially been warm enough and sequencing through transfer circle 203 to FIG. 5D, the microprocessor then moves the sequence to a program decision step 292 comparing the oil temperature to a predetermined upper limit (e.g., 125° F.). If the oil temperature is above the upper limit, the red lamp 18 is turned on in a program step 294. At about the same time a program step 296 causes "OIL HOT" to be displayed on the display screen 108. At or about this time, sequencing through transfer circle 297 to FIG. 5E, a program step 298 de-energizes the oil heater or assures that the oil heater is off. The operator can see the red lamp 18 and also the words "HOT OIL" on the display screen 108. At the program step 302, the operator can query the database for diagnostic suggestions such as "check oil heater" or "check ambient temperature."

Preferably, the program should not simply be continued after a hot-oil condition. Other parameters may have drifted out of tolerance during the "oil hot" condition. Therefore, it is deemed prudent to recheck the already checked parameters before continuing with the start-up sequence. Consequently, after the operator is satisfied that a dangerous condition does not exist, the program sequence may be manually restarted by the operator in a program step 304. The restart of the program is accomplished by transfer circle 306 which feeds the program control back to the system test step 204.

Preferably, it is desired not to start the mist generating process when the oil is above a predetermined upper working temperature (e.g., 110° F.). Therefore, even if the oil temperature is not hot enough to trigger the alarm as a result of the decision step 292, it is still preferred that the oil not be above the upper working temperature. Therefore, even if the decision step 292 had determined that the oil temperature was not dangerously hot, the program sequence proceeds from a negative answer of the decision step 292 through a transfer circle 293 to FIG. 5E to an oil-temperature-within-range decision step 308. If the oil temperature is NOT between the predetermined lower and upper working limit values, the program sequence loops back via transfer circle 313 which feeds the program back to check oil temperatures again at step 268 (FIG. 5C). If the oil temperature is between the upper working limit value (e.g., 110° F.) and the dangerously-high value (e.g., 125° F.), the program sequence will go into an endless loop until the oil cools to the upper working limit value (e.g., 110° F.).

Finally, when the oil temperature is between the predetermined lower and upper working limit values, the program sequences through transfer circle 309 to FIG. 5C wherein the next program step 310 causes "OK TO START" to appear on the display screen 108. The program sequence then advances to a step 312 at which "OPEN AIR VALVE" appears on display screen 108. The program sequence is then paused in a step 314 while the user turns on and adjusts the air supply using the knob on top of the air regulator 24. The regulated air pressure sensor signal may be displayed on the display screen 108 so that the operator can visually adjust the air pressure. When the operator completes the opening and adjustment of the pressurized-air valve, the mist pressure sensor, upon sensing the minimum mist pressure, (above lower limit) causes the sequence to continue.

After the air valve has been manually opened by the operator at the step 314, the program sequence advances to a decision step 316 which determines whether or not the mist pressure is above the lower limit. If YES, the mist pressure is above the lower limit, "START-UP" appears on the display screen 108 as a result of program step 318. At the program step 320, the sequence is delayed for one minute in the step 320 to allow the misting system and air flow to stabilize. After the one-minute delay, the green lamp 18 is turned on in a step 322.

After the green light is turned on or if there is a negative answer at the decision step 316, the program sequence advances to a decision step 326. If YES, the mist pressure is too high, the green lamp is turned off and the red lamp is turned on in a program step 328. After sequencing through transfer circle 329 the message "CHECK SYSTEM-HP" appears on the display screen 108, in a program step 330; and the sequence stops in a step 332. This gives the operator an opportunity during the step 334 to query the database for diagnostic suggestions such as: "check mist line for traps," and "check for plugged fittings," and "check pressure regulator." After the high-pressure situation in the mist line has been corrected, the operator can command the microprocessor, also in the step 334, to continue with the program sequence. In the next program step 336, the red lamp is turned off.

After the red lamp 18 has been turned off in the step 336 or if the mist pressure had not been above the upper limit value and sequencing through transfer circle 327 to FIG. 5D, the program sequence advances to another decision step 340 in which the mist pressure is queried. If the mist pressure is below a predetermined lower limit, the microprocessor executes a step 342 in which the red light is turned on. The program sequence then continues through transfer circle 343 to FIG. 5E. At the next sequence step 344, the display screen 108 displays "CHECK SYSTEM-LP." The program sequence stops at the next step 346. An operator query step 348 follows, and the operator can command the microprocessor to display diagnostic suggestions on the screen, such as "Check mist line & fittings" and "Check pressure regulator." After the low-mist-pressure situation has been corrected, the operator manually addresses the program at the query step 348 to continue the program sequence.

After the program step 348 or if the decision step 340 gives a negative answer, the program sequence advances to a decision step 350 which ascertains whether the mist pressure is between the upper and lower limits. If NO, the mist pressure is not between the upper and lower limits, the sequence goes back to the decision step 326 (FIG. 5C) through transfer circle 309. However, if YES, the mist pressure is between the upper and lower limits, the red lamp is turned off and the green lamp is turned on in the step 352. In step 354, the message "OK TO START" appears on the display screen 108. In step 356, a one-minute delay is introduced into the program sequence. After the one-minute delay, the monitoring program sequence (FIGS. 5F to 5H) is started after transfer, at transfer circle 358, to the program of FIG. 5F. The oil mist generating system now operates while being monitored, as will be described below.

Figure 5F:
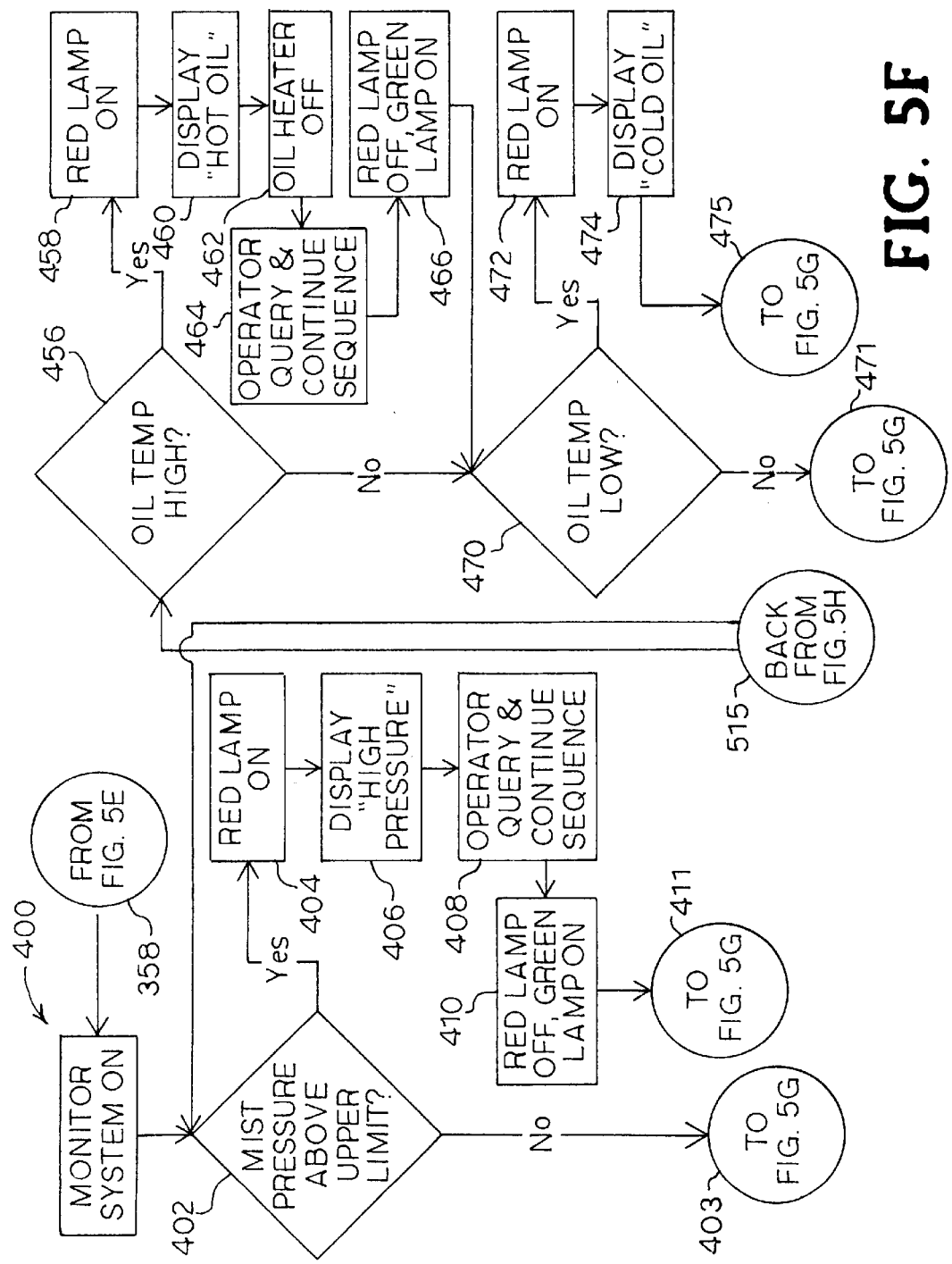
FIGS. 5F, 5G and 5H is a flow diagram of an embodiment of an automated operation monitoring and diagnostic sequence according to the present invention.
Figure 5G:
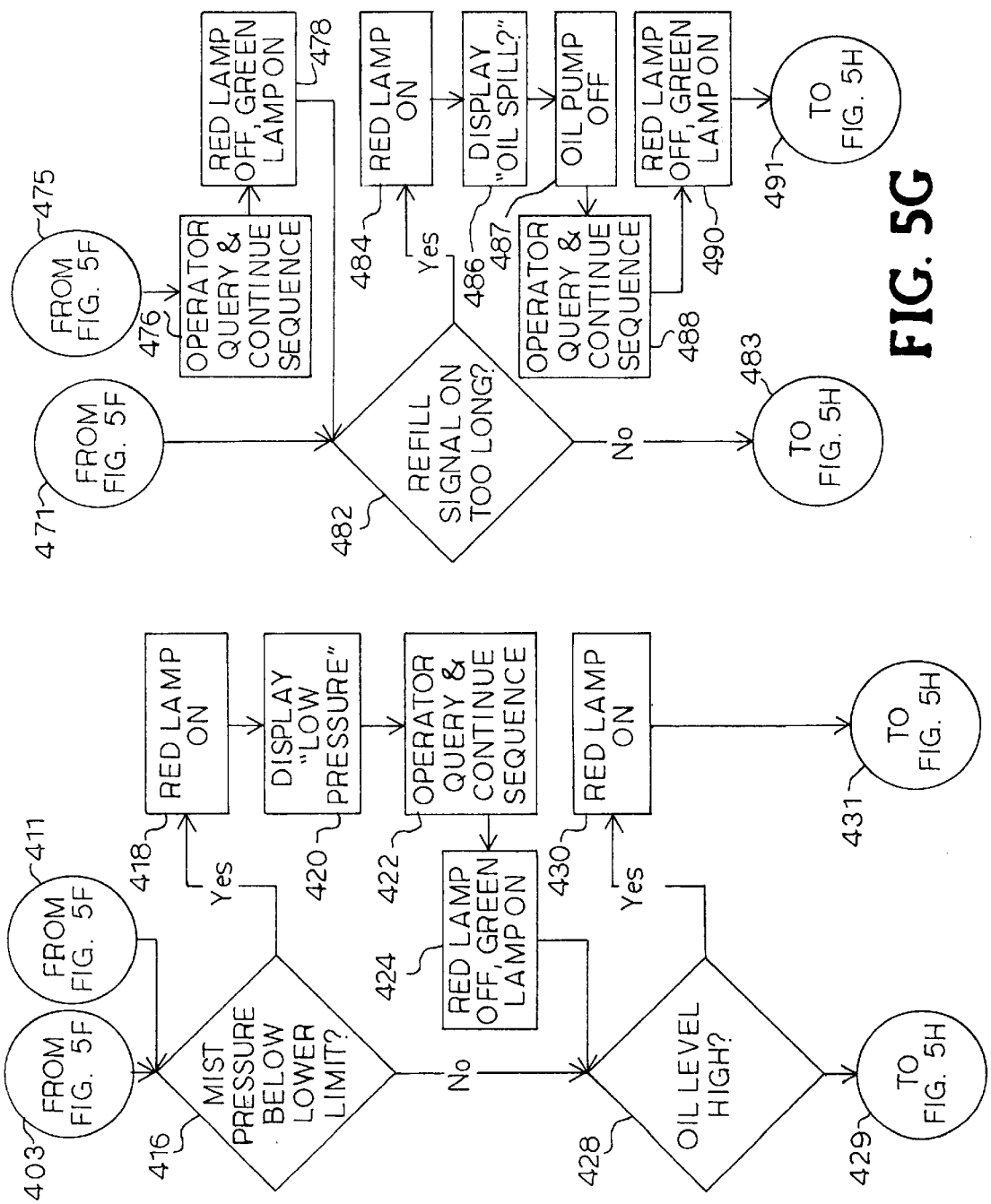
Figure 5H:
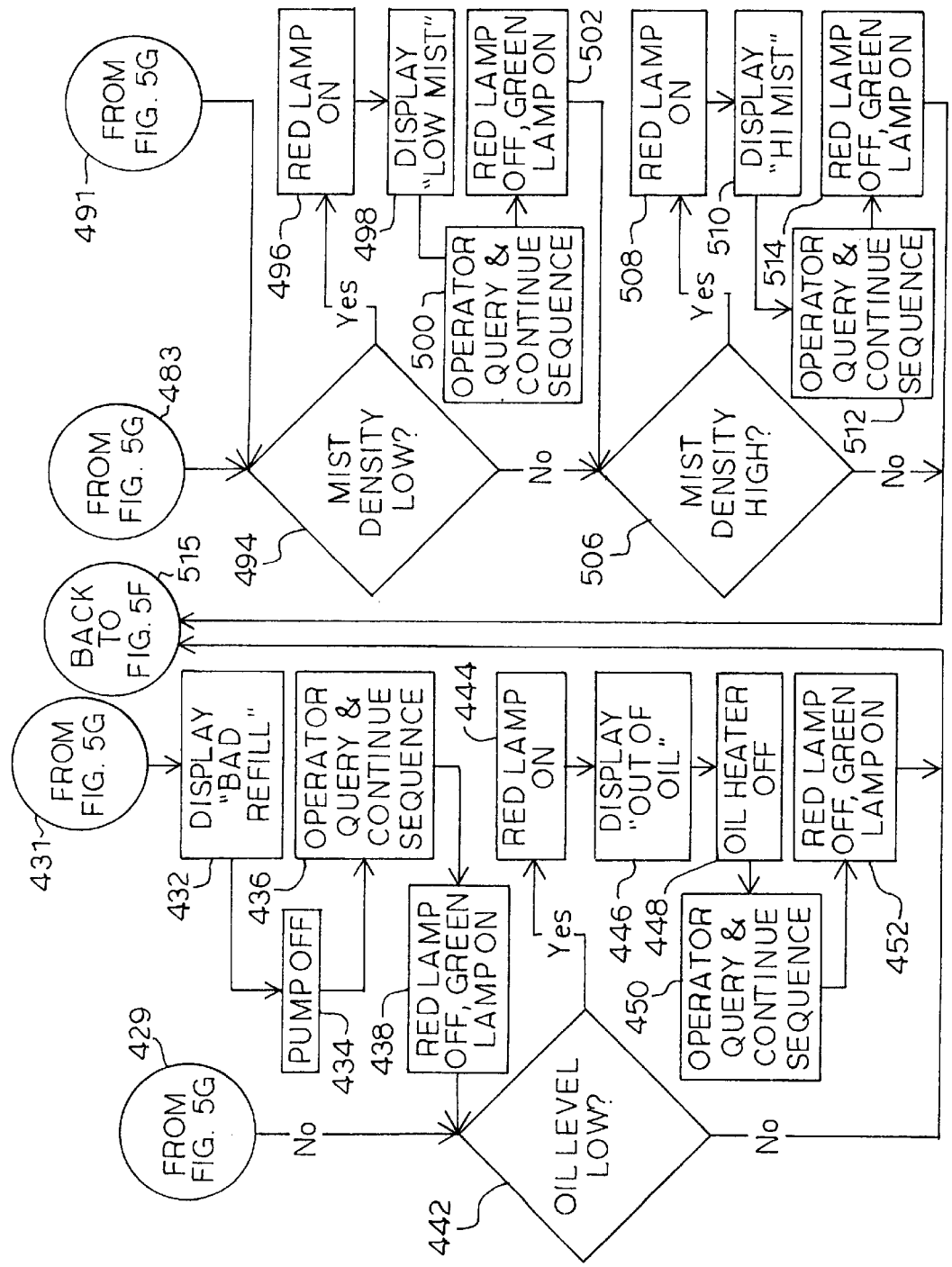

A monitoring sequence 400 in accordance with the present invention is shown in FIGS. 5F to 5H. The following describes the system and method for monitoring and diagnostic troubleshooting for mist pressure, oil level, mist density and oil refill. However, it is understood that other operating parameters could be monitored and we do not intend the limit the invention to those parameters discussed below.

The initial step 402 in the monitoring sequence 400 is to determine if the mist pressure is above a predetermined limit. If so, the microprocessor executes an alarm step 404 wherein the red lamp is also turned on-in this program sequence, whenever the red lamp is turned on, the green lamp is also turned off At the same time, in step 406, a message such as "HIGH PRESSURE" appears on the display screen 108. In an operator query step 408, the operator can manipulate the buttons of the key pad 110 to obtain suggestions about how to diagnose the problem. The resulting database readout on the display screen 108, that results from the operator's query, is intended to guide the operator through a series of troubleshooting operations.

Diagnostic suggestions for correcting high mist pressure displayed in the user query step 408 are "Check mist line for traps", "Check for plugged fittings" and "Check pressure regulator." After the operator has corrected the high-pressure problem, a program step 410 turns off the red lamp 18 and turns the green lamp on.

After the high-mist-pressure problem has been resolved the program continues through transfer circle 411, or if the mist pressure was not too high through transfer circle 403, to FIG. 5G the next program step 416 is a decision that asks if the mist pressure is below a predetermined lower limit. If YES, the mist pressure is too low, the red lamp is turned on in an alarm step 418. At the same time, in step 420, a message such as "LOW PRESSURE" appears on the display screen 108. Diagnostics displayed in an operator query step 422 are "Check mist line & fittings" and "Check pressure regulator." After the operator has corrected the low-pressure problem, the operator manually continues the program sequence at the step 422. The red lamp is turned off and the green lamp is turned on in a step 424.

After the low-mist-pressure problem has been resolved or if the mist pressure was not too low, the next program decision step 428 is a decision that asks if the oil level in the reservoir 38 is above a predetermined upper limit. If YES, the oil level is too high, the red lamp is turned on in an alarm step 430. At the same time, the program sequences to a step 432 in FIG. 5H through transfer circle 431, wherein a message such as "BAD REFILL" appears on the display screen 108; and the oil fill pump is turned off in a step 434. Diagnostic suggestions shown on the display screen 108 in an operator query step 436 include "Check the solenoid valve" and "Check the signal sent to turn off pump." After the operator has corrected the high-oil-level problem, the operator manually continues the program sequence at the step 436. The red lamp is turned off and the green lamp is turned on in a step 438.

After the high-oil-level problem has been resolved or if the oil level in the reservoir 38 was not too high and sequencing through transfer circle 429 to FIG. 5H, the next program decision step 442 is a decision that asks if the oil level in the reservoir 38 is below a predetermined lower limit. If YES, the oil level is too low, the red lamp 18 is turned on in an alarm step 444. At the same time, in a step 446, a message such as "OUT OF OIL" appears on the display screen 108; and the oil heater is turned off in a step 448. Diagnostic suggestions shown on the display screen 108 in an operator query step 450 include "Check oil supply tank" and "Check oil supply line ." After the operator has corrected the low-oil-level problem, the operator manually continues the program sequence at the step 450. The program sequence continues through transfer circle 515 to FIG. 5F. The red lamp is turned off and the green lamp is turned on in a step 452.

The next steps in the monitoring sequence 400 comprise oil temperature monitoring. In a first step 456, the oil temperature is compared to a predetermined upper limit temperature. If the oil temperature is above the upper limit, the red lamp is turned on in an alarm step 458. In the next program step 460, the message "HOT OIL" is displayed on the display screen 108; and the microprocessor also executes a step 462 of turning off the oil heater. Diagnostics displayed in a user query step 464 include "Replace oil heater" and "Consider room temperature."After the operator has corrected or otherwise resolved the high-oil-temperature problem, the operator manually continues the program sequence at the step 464. The red lamp is turned off and the green lamp is turned on in a step 466.

A next step 470 is to determine if the oil temperature is below a predetermined minimum temperature. If the oil temperature is below the minimum temperature, the red light is turned on in alarm step 472. At about the same time, the message "COLD OIL" is displayed on the display screen 108, in a step 474. The program sequence continues through transfer circle 475 to FIG. 5C wherein diagnostic suggestions are displayed when the operator performs a query at the program step 476. Successive suggestions on the display screen 108 include "Replace oil heater" and "Check if cold oil just added to tank".

After the operator has corrected or otherwise resolved the low-oil-temperature problem, the operator manually continues the program sequence at the step 476. The red lamp is turned off and the green lamp is turned on in a step 478.

After the low-oil-temperature problem has been resolved or if the temperature of the oil in the reservoir 38 was not too low and sequencing through transfer circle 471 to FIG. 5G, the next program decision step 482 is a decision that asks if the oil reservoir refill pump signal has been calling, for too long a time (e.g., for more than five minutes), for the oil refill pump to add oil to the reservoir 38. If YES, the add-oil signal has been on for too long, the red lamp 18 is turned on in a step 484. At the same time, in a step 486, a message such as "OIL SPILL?" appears on the display screen 108; and the oil pump is turned off in a step 487. Diagnostic suggestions shown on the display screen 108 in an operator query step 488 include "Check oil line" and "Check oil supply tank" and "check refill pump." After the operator has corrected or otherwise resolved the oil-refit problem, the operator manually continues the program sequence at the step 488. The red lamp is turned off and the green lamp is turned on in a step 490.

After the oil refill signal problem has been resolved or if the oil reservoir refill pump has not been calling for oil for too long a time, the program sequence continues through transfer circle 491 or transfer circle 483, respectively, to FIG. 5H. As with oil level and oil temperature, mist density is monitored in sequential steps 494 and 506 to determine if the mist density is above or below predetermined working limit levels. At the decision step 494, the output of the mist-density-sensing photocell is sampled to ascertain of the mist density is below a predetermined minimum value. If YES, the density of the oil mist is below the minimum value, the red lamp 18 is turned on in a step 496. At about the same time, the message "LOW MIST" appears on the display screen 108 in a step 498. The program sequence stops for an operator query at a step 500, at which time the operator can request diagnostic suggestions from the microprocessor's database. Such suggestions might include "check oil adjustment screw" and "check oil temperature" and "clean oil intake filter." After the operator has cleared the low-oil-mist-density problem, the operator manually signals at the keypad 110 for the program sequence to continue in the step 500. The next step 502 in the program sequence is to turn off the red lamp 18 and turn on the green lamp.

After the low-mist condition has been cleared or if the mist density had not been low at the decision step 494, the program sequence 400 advances to a decision step 506 to determine if the mist density is too high. If YES, the mist density is higher than a predetermined maximum, the red lamp is turned on in a program step 508. At about the same time, in a program step 510, the message "HIGH MIST" appears on the display screen 108. The program sequence then stops at a step 512 and allows the operator to enter a request for diagnostic suggestions. Such suggestions could include "check oil adjusting screw" and "check system pressures." After the operator has cleared the high-density-mist condition, the operator manually enters a command at step 512 for the program sequence to continue. The program does so by advancing to a step 514, at which the red lamp is turned off and the green lamp is turned on.

By progressing from the high-mist-pressure step 402, through the step 514, the program has sampled all of the oil-mist system parameters that are preferably desired to be sampled by the monitor program 400. Therefore, after successfully executing the monitor program 400, the program sequence starts all over again at the program step 402 after the program step 514 or the negative response from the program step 506, by sequencing through transfer circle 515 to FIG. 5F.

Although the present invention is primarily directed to a user-friendly automated start-up and monitoring system and method, it is understood that the system and method of the present invention is expandable to include automatic control of the operating parameters. The control may be provided by the same microprocessor-based system as the monitoring. Where control is also provided, the microprocessor is programmed to produce control signals to maintain operating variables within the predetermined limits thus allowing automated control of the operating parameter being monitored. The annunciator is also programmed so that each alarm signal is logged with a time and condition statement to aid troubleshooting. This history can be accessed by using the keypad on the annunciator face. The annunciator will store these events up to the systems memory limit and then erase the oldest event and replace the erased event with the latest event.

For remote information monitoring, the electronic signal outlet 66 may comprise a computer-compatible port, such as an RS 422/485, for connecting the data assembly 100 via digital cable 700 to a remote, central desktop or laptop computer 701. This allows the user two-way communication with the system. That is, the user may monitor the system from the remote location and, if desired, modify operating parameters of the system therefrom. The mechanical gauges described above provide redundant data for back-up and for use as a diagnostic aid. This eliminates the need to locally change parameters at the unit for each individual unit. The data processor also has the ability to query the microprocessor locally and remotely.

Figure 4:
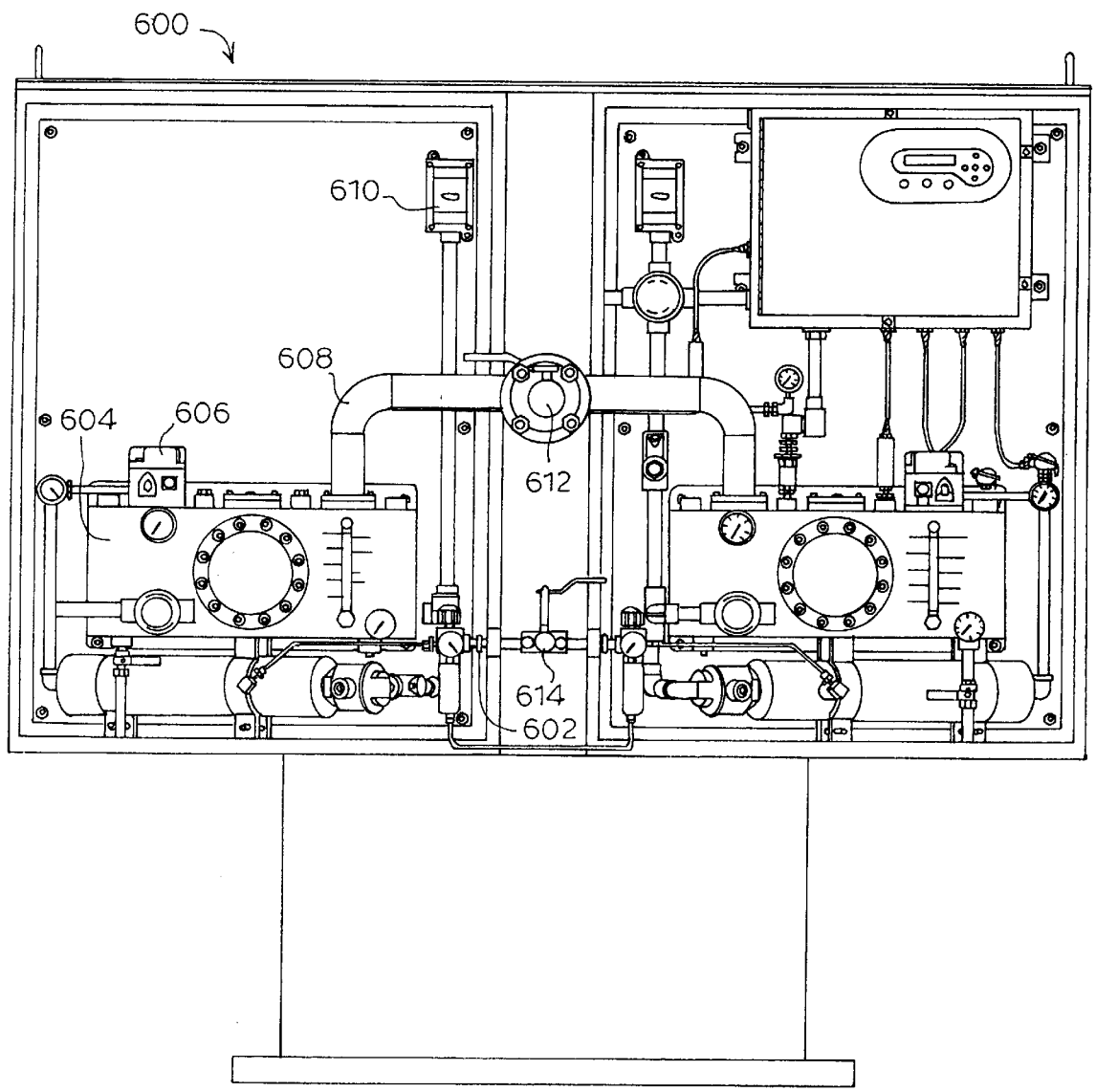
FIG. 4 is an elevational view of an oil mist generating system cabinet, housing the components of regular and stand-by oil mist generating systems.

Another embodiment of the oil mist generating system of the present invention is shown in FIG. 4. This embodiment includes a regular unit, generally designated at 10 as in FIG. 1, and a stand-by unit generally designated at 600. The stand-by unit 600 includes an air inlet 602 and a reserve oil reservoir 604 provided with a mist generating head 606 and a high volume outlet 608. A sealed disconnect switch 610 powers the stand-by unit 600. As seen in FIG. 4, two 3-way manual diverter valves 612, 614 are connected in common to both the regular unit 10 and the stand-by unit 50. One 3-way valve 612 connects the mist outlets 46, 608. The other 3-way valve 614 connects the air supply inlets 20, 602.

The 3-way valves are used for switching from the regular unit to the stand-by unit when the regular unit malfunctions, during maintenance, or any other time the regular unit is temporarily out of service. The user initiates operation of the stand-by unit actuating the disconnect switch 610. This step activates the oil heater in the stand-by reservoir 604. The regular and stand-by-systems' oil heaters are wired separately allowing the user to preheat the oil in the stand-by unit so that the stand-by unit is instantly ready for use when the systems are switched over. This also facilitates the testing of the individual units in troubleshooting circumstances. When the oil is warm, the user manually turns the three-way valves, thereby closing regular unit's mist outlet 46 and air supply inlet 20 and opening the stand-by unit's mist outlet 608 and air supply inlet 602. Since the stand-by unit is only for temporary operation, only minimal instrumentation is needed. Also, as shown in FIG. 4, adding oil to the reserve reservoir 604 is preferably manual. However, if desired, another common 3-way valve connection could be provided to a source of refill oil. While FIG. 4 shows a end-to-end configuration, it is understood that the units may be connected back-to-back or one above the other.

The system and method of the present invention is a vast improvement over existing oil mist generation technology as a result of both mechanical changes and advances in monitoring technology. The ability to reliably provide oil mist to critical machinery in an electrically hazardous environment is enhanced. The system and method provide the user with on-line help and warnings related to system parameters that might predictably interfere with mist generation and lubrication of machinery. The system and method are particularly adapted to assist the user in start-up and troubleshooting procedures. The microprocessor-guided start-up process insures that the equipment to be lubricated will be lubricated and does not result in a signal to the system to begin operation until all criteria for producing and delivering good quality oil mist are met. The system provides warnings about conditions that would be predictive of system failure, and the existence of other fault conditions and can shut down the system in case of certain fault conditions. The user is guided via diagnostic information provided by the monitoring system. Faults are quickly diagnosed for quick correction. The monitoring sequence also prompts the user for the required input. Information is available without having to consult a system operating manual or other technical information.

Many of these objectives have been considered in the past, but the present invention is the first to combine them in a microprocessor-based overall system and method. Moreover, while there is some latitude within the framework of the start-up and monitoring sequences, the sequences guide the user in a manner which insures minimal opportunity for damage to the system and machinery to be lubricated. The method and system are further enhanced by providing non-alphanumeric character set readouts and two-way remote communication. The user is guided through problem solving steps to correct the problem locally or remotely. During serious malfunction or maintenance, 3-way valves speed up the switch-over to the stand-by unit and simplifies piping of the system. The present invention also reduces or minimizes the use of relay-based logic by using non-incentive microprocessor controls. Thus, the user is able to eliminate a lot of the conduit and seals that have typically been required. By utilizing the potential of microprocessor monitoring, a safer and more effective oil mist lubrication system is now possible at small cost.

Although the present invention has been described in considerable detail in connection with a preferred embodiment thereof, it will be understood, of course, that we do not intend to limit the invention to that embodiment since modifications may be made by those skilled in the art, particularly in light of the foregoing teachings. On the contrary, we intend to cover all alternatives, modifications and equivalents as may be included within the spirit and scope of the invention as defined by the appended claims. It is, therefore, contemplated by the appended claims to cover any such modifications as incorporate those features which constitute the essential features of these improvements.

We claim:

1. A mist generating system, the mist generating system comprising:

means for supplying pressurized air;

means for supplying oil, the oil supply means comprising a reservoir for liquid oil;

means for generating a mist of oil connected to the pressurized air supply means and the oil supply means, a plurality of sensors for monitoring current values of the air temperature of the pressurized air supply means, the oil temperature of the oil supply means, the oil level in the reservoir and the mist pressure of the mist generating means, and for generating data signals based on the monitored values;

means for processing the data signals, the data processing means functionally connected to the sensors and responsive to the monitored values for generating a signal if one of the monitored values is not within a predetermined range of values;

a visual display device for displaying programmed messages based on the signal generated by the data processing means; and means responsive to a manual user inquiry for visually displaying on the visual display device programmed messages directing the user to take predetermined actions to maintain the system at an appropriate operating level.

2. A mist generating system as recited in claim 1, wherein the data processing means compares each of the monitored values with predetermined value points comprising the extremes of the predetermined range of values and generates an alarm signal if at least one of the monitored values is beyond one of its associated predetermined value points.

3. A mist generating system as recited in claim 2, wherein the displayed messages are for diagnosing and correcting the reason for an alarm signal.

4. A mist generating system as recited in claim 1, wherein the data processing means initiates or terminates steps in a start-up sequence for the system in response to the monitored values.

5. A mist generating system as recited in claim 1, wherein the messages displayed by the visual display device include non-alphabetic character sets.

6. A mist generating system as recited in claim 1, further comprising a keypad by which the user may access the monitored values and request further programmed messages for troubleshooting the system.

7. A mist generating system as recited in claim 1, further comprising a computer-compatible communication port for transmitting data signals and the data processing means signals to a remote location.

8. A mist generating system as recited in claim 7, wherein the computer-compatible communication port provides for two-way communication with a remote location.

9. A mist generating system as recited in claim 8, wherein the computer-compatible communication port is an RS 422/485 port.

10. A mist generating system as recited in claim 1, wherein the data processing means includes means for setting the value points comprising the extremes of the predetermined range of values.

11. A mist generating system as recited in claim 10, wherein the value point-setting means comprises a keypad by which the data processing means is programmable to change the value points for the monitored values.

12. A mist generating system, said system comprising:
means for supplying pressurized air,
means for supplying oil,
two separate means for generating a mist of oil connected to the pressurized air supply means and the oil supply means, the mist generating means sharing a common connection to the air supply means, and
a three-way valve for controlling the air supply to the mist generating means.

13. A mist generating system as recited in claim 12, further comprising separate means for heating the oil supply of the regular and stand-by units, and means for energizing either or both oil supply heating means for providing instant use of the stand-by system during cold weather.

14. A method for monitoring a mist generating system, the monitoring method comprising the steps of:
supplying pressurized air and oil to a mist generating means,
generating mist,
monitoring current values of the air supply temperature, the oil supply temperature, and the mist pressure,
generating a data signal based on the monitored values,
processing the data signals,
generating a signal based on the data processing step,
providing a visual display device, and
displaying pre-programmed messages on the visual display device for directing the user to take predetermined actions for maintaining the system at an appropriate operating efficiency if one of the monitored values is outside a range of allowable current values.

15. A mist monitoring method as recited in claim 14, wherein the step of generating a signal comprises generating an alarm signal.

16. A mist monitoring method as recited in claim 15, wherein a memory of alarm events is electronically maintained that is user accessible for troubleshooting occasions.

17. A mist monitoring method as recited in claim 14, further comprising the step of initiating or terminating steps in the start-up sequence of the system in response to the monitored values.

18. A method of using a plurality of sensors and a microprocessor with an operator interface to monitor the parameters involved in the start-up of an apparatus for generating a mist of oil to be used for lubricating mechanical equipment, said method comprising the steps of:
 a) exercising the operator interface to confirm to the operator that the interface is in working order;
 b) sequentially comparing the output of each sensor with a limit value of the output of that sensor in order to ascertain if the measured parameter of the apparatus that relates to the compared sensor is beyond the limit value predetermined for that parameter;
 c) advancing the sequence of comparisons if the measured and compared parameter sensor output is not beyond the predetermined limit value;
 d) if the compared parameter sensor output is beyond the predetermined limit value, using the interface to alert the operator and pausing the sequence to allow operator correction of the out-of-limit parameter;
 e) providing, at the interface, at the operator's request, at least one diagnostic suggestion for correcting the beyond-limit condition of the parameter last compared;
 f) in response to a manual input from the operator, continuing the sequence of comparisons; and
 g) after the last comparison programmed into the sequence, commanding the apparatus to provide oil mist to the mechanical equipment to be lubricated.

19. A mist monitoring method as recited in claim 18, wherein at least one of the sensors senses the current air temperature values of an air supply, and the step of comparing the output of the sensor with a limit value comprises comparing the air temperature value with predetermined stored maximum and minimum values for the air temperature.

20. A mist monitoring method as recited in claim 18, wherein at least one of the sensors senses the current oil temperature values of an oil supply, and the step of comparing the output of the sensor with a limit value comprises comparing the oil temperature value with predetermined stored maximum and minimum values for the oil temperature.

21. A mist monitoring method as recited in claim 18, wherein at least one of the sensors senses the current mist pressure values, and the step of comparing the output of the sensor with a limit value comprises comparing the mist pressure with predetermined stored maximum and minimum values for the mist pressure.

22. A mist monitoring method as recited in claim 18, wherein at least one of the sensors senses the quantity of available liquid oil, and the step of comparing the output of the sensor with a limit value comprises comparing the oil level with predetermined stored maximum and minimum values for the available oil quantity.

23. A system for controlling the start-up and for monitoring the operation of an apparatus for generating a mist of oil for lubricating mechanical equipment, the oil mist generating apparatus including a source of pressurized air, a reservoir of liquid oil, an oil misting head for atomizing the liquid oil into a stream of flowing pressurized air, a heater for the liquid oil, and sensors for measuring parameters at various portions of the apparatus, a microprocessor, cooperating with a database of information, for executing the steps of a stored program and including an interface for communicating to an operator and for accepting commands from the operator; said controlling system comprising:
 a) means, including the microprocessor and its stored program, for sequentially comparing the outputs of the sensors with limit values for each sensor, as stored in the database;

b) means, including the microprocessor, for advancing the sequential comparing of the outputs of the sensors as long as the outputs of the sensors are not beyond their associated limit values;

c) means, including the operator interface, for informing the operator when a comparison indicates that the output of a sensor is beyond the limit value for that sensor;

d) means, within the stored program, for stopping the execution of the stored programmed sequential comparisons, if a parameter is beyond its limit value;

e) means, including the database, for presenting diagnostic suggestions to the operator at the interface, in response to a manual request from the operator, entered at the interface; and f) means, including the operator interface, for continuing the sequential comparisons of the sensor outputs, in response to a manual input from the operator.

24. A mist generating system as recited in claim 23, wherein one of the sensors monitors the current air temperature values of the pressurized air source.

25. A mist generating system as recited in claim 23, wherein one of the sensors monitors the current oil temperature values of the oil.

26. A mist generating system as recited in claim 23, wherein one of the sensors measures the oil level in the reservoir.

27. A mist generating system as recited in claim 23, wherein one of the sensors measures the mist pressure values of the generated mist.

28. A mist generating system as recited in claim 23, further comprising an operator interface including a keypad.

29. A mist generating system as recited in claim 23, further comprising an operator interface including a remote computer for two-way communication with the system.

30. A mist generating system as cited in claim 23, further comprising mechanical gauges for providing real-time visual representation of the system parameters.

31. A mist generating system, the mist generating system comprising:

means for supplying pressurized air;

means for supplying oil, the oil supply means comprising a reservoir for liquid oil;

means for generating a mist of oil connected to the pressurized air supply means and the oil supply means, a plurality of sensors for monitoring current values of the pressurized air supply means, the oil supply means, and the mist generating means, and for generating data signals based on the monitored values;

means for processing the data signals, the data processing means functionally connected to the sensors and responsive to the monitored values for generating a signal if one of the monitored values is not within a predetermined range of values;

a computer-compatible communication port for transmitting the signals to a remote location and for receiving signals from the remote location;

a visual display device at the remote location, wherein the signals generated by the data processing means display programmed messages on the visual display device based on the signal generated by the data processing means; and means responsive to a manual user inquiry from the remote location for visually displaying on the visual display device programmed messages directing the user to take predetermined actions to maintain the system at an appropriate operating level.

32. A mist generating system as recited in claim 31, wherein the computer-compatible communication port is an RS 422/485 port.

33. A mist generating system as recited in claim 31, wherein the data processing means compares each of the monitored values with predetermined value points comprising the extremes of the predetermined range of values and generates an alarm signal if at least one of the monitored values is beyond one of its associated predetermined value points.

34. A mist generating system as recited in claim 31, further comprising means for accessing the monitored values from the remote location and requesting further programmed messages for troubleshooting the system.

* * * * *